United States Patent
Sinclair et al.

(10) Patent No.: US 9,093,104 B2
(45) Date of Patent: Jul. 28, 2015

(54) TECHNIQUE FOR MANUFACTURING BIT PATTERNED MEDIA

(75) Inventors: Frank Sinclair, Quincy, MA (US); Julian G. Blake, Gloucester, MA (US); Helen L. Maynard, North Reading, MA (US); Alexander C. Kontos, Beverly, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 272 days.

(21) Appl. No.: 13/342,762

(22) Filed: Jan. 3, 2012

(65) Prior Publication Data

US 2012/0175342 A1 Jul. 12, 2012

Related U.S. Application Data

(60) Provisional application No. 61/429,456, filed on Jan. 4, 2011.

(51) Int. Cl.
*B44C 1/22* (2006.01)
*G11B 5/855* (2006.01)

(52) U.S. Cl.
CPC ...................................... *G11B 5/855* (2013.01)

(58) Field of Classification Search
None
See application file for complete search history.

(56) References Cited

U.S. PATENT DOCUMENTS

| | | | |
|---|---|---|---|
| 4,401,054 A * | 8/1983 | Matsuo et al. | 118/723 MR |
| 5,936,291 A * | 8/1999 | Makita et al. | 257/405 |
| 2008/0084635 A1 | 4/2008 | Lee et al. | |
| 2009/0059430 A1 * | 3/2009 | Dobisz et al. | 360/137 |
| 2009/0214895 A1 * | 8/2009 | Hinoue et al. | 428/827 |
| 2009/0214898 A1 * | 8/2009 | Hinoue et al. | 428/848.5 |
| 2011/0111159 A1 * | 5/2011 | Sinclair et al. | 428/64.2 |
| 2012/0063033 A1 * | 3/2012 | Gurney et al. | 360/234.3 |
| 2012/0064373 A1 | 3/2012 | Sinclair et al. | |

FOREIGN PATENT DOCUMENTS

| | | |
|---|---|---|
| EP | 0135020 A1 | 3/1985 |
| WO | 2012033988 A1 | 3/2012 |

OTHER PUBLICATIONS

Ouchi, Kazuhiro, et al., Properties of Perpendicular Recording Media Continuously Prepared with New Sputtering Sources, IEEE Transactions on Magnetics, Nov. 1991, pp. 4912-4914, vol. 27, No. 6, IEEE.

Zheng, Min, et al., Seedlayer and Preheating Effects on Crystallography and Recording Performance of CoCrPtB Perpendicular Media, IEEE Transactions on Magnetics, Sep. 2002, pp. 1979-1981, vol. 38, No. 5, IEEE.

Lee, Li-Lien, et al, MgO Seed Layers for CoCrPt/Cr Longitudinal Magnetic Recording Media, Applied Physics Letters, Dec. 11, 1995, pp. 3638-3640, vol. 67, No. 24, American Institute of Physics.

* cited by examiner

*Primary Examiner* — Binh X Tran
*Assistant Examiner* — David Cathey, Jr.

(57) ABSTRACT

A novel technique for manufacturing bit patterned media is disclosed. In one particular exemplary embodiment, the technique may be realized as a method for manufacturing bit pattern media. The technique, which may be realized as a method comprising: forming a non-catalysis region on a first portion of a catalysis layer; forming a non-magnetic separator on the non-catalysis region; and forming a magnetic active region on a second portion of the catalysis layer adjacent to the first portion of the catalysis layer.

16 Claims, 6 Drawing Sheets

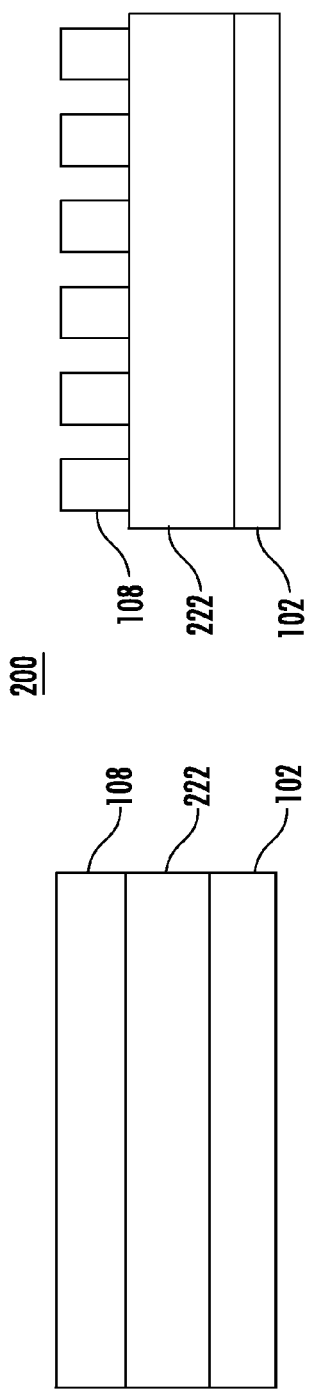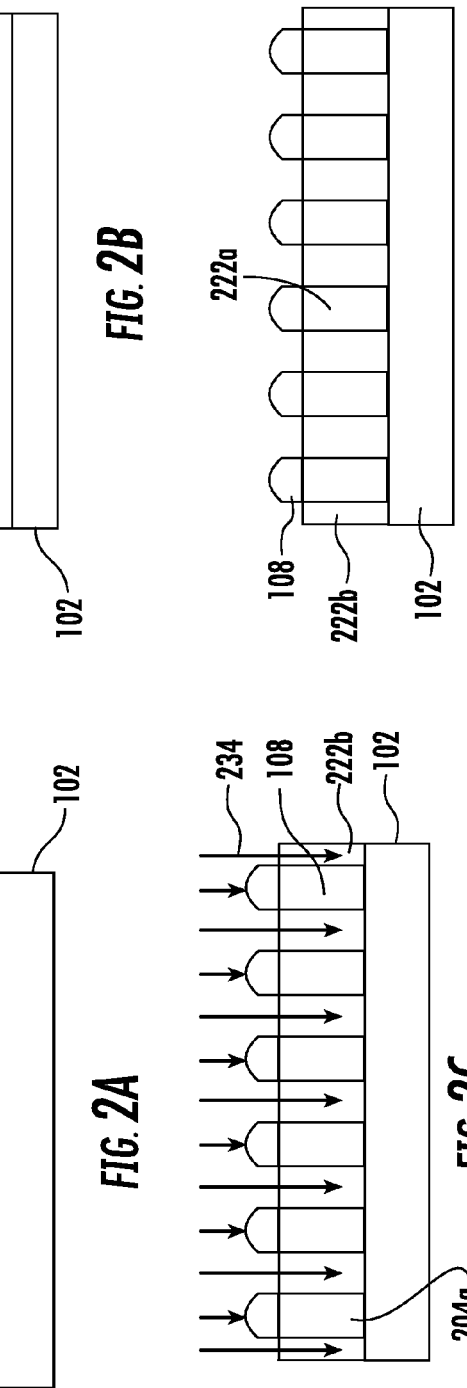

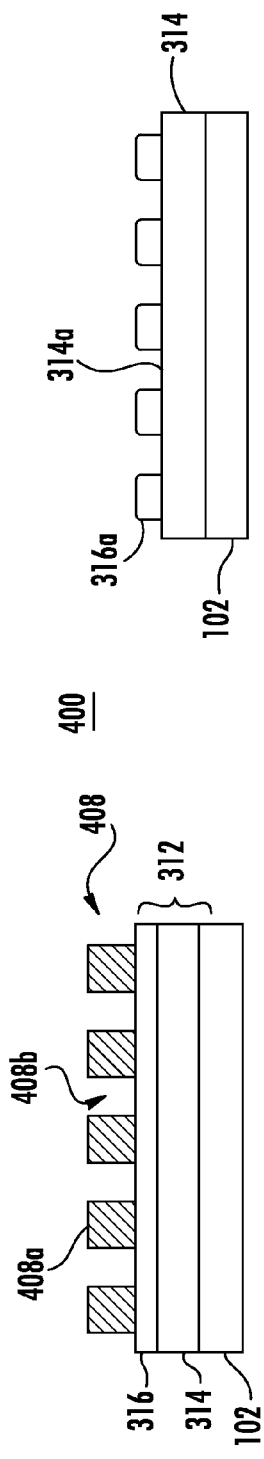
FIG. 4A
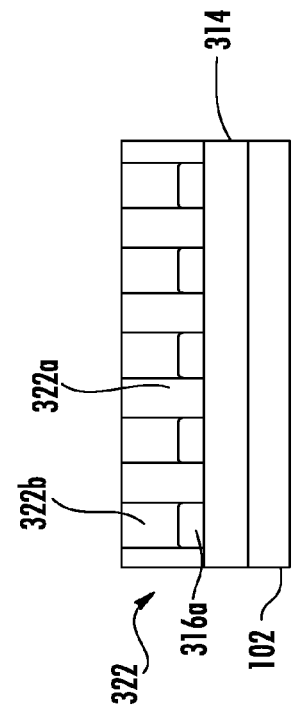
FIG. 4B
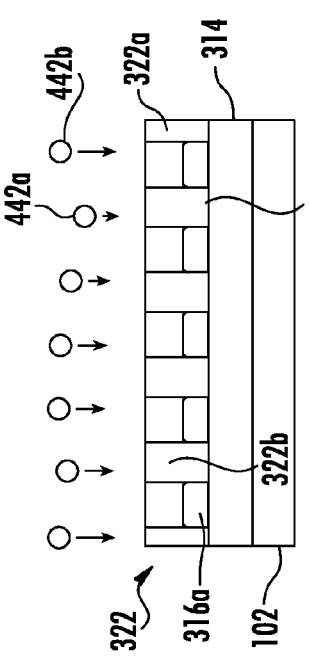
FIG. 4C
FIG. 4D
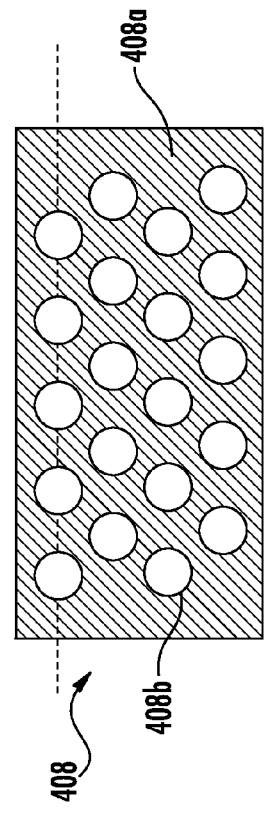
FIG. 4E
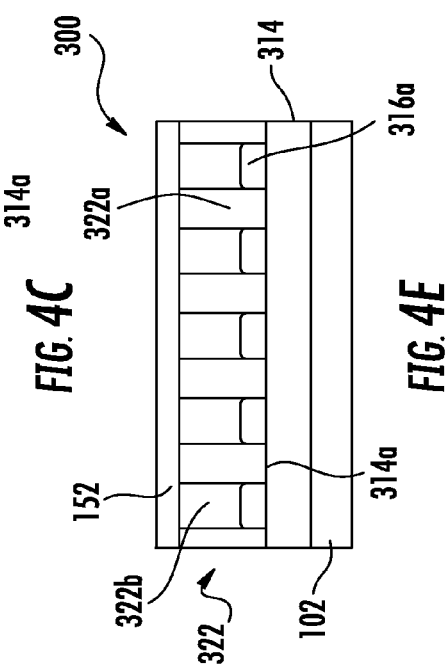
FIG. 4F

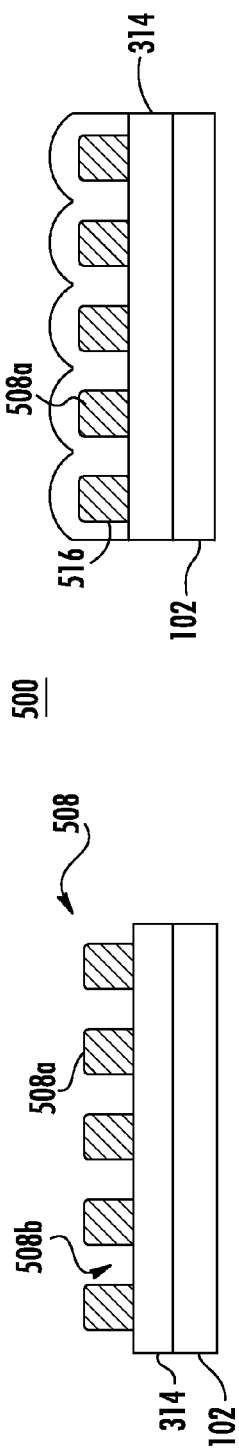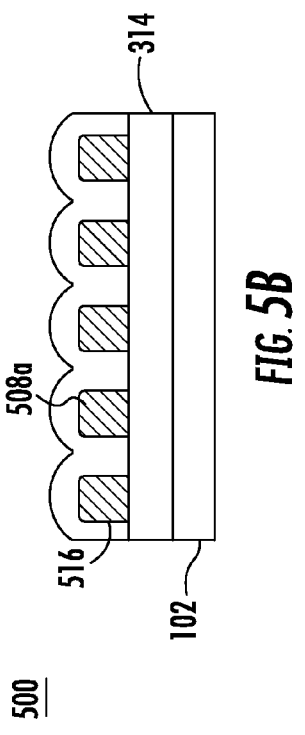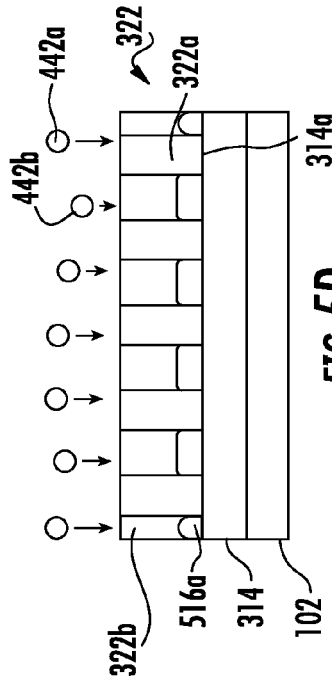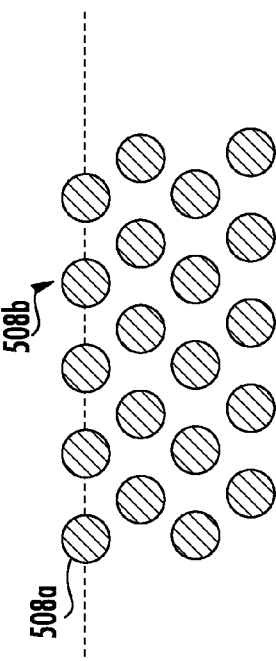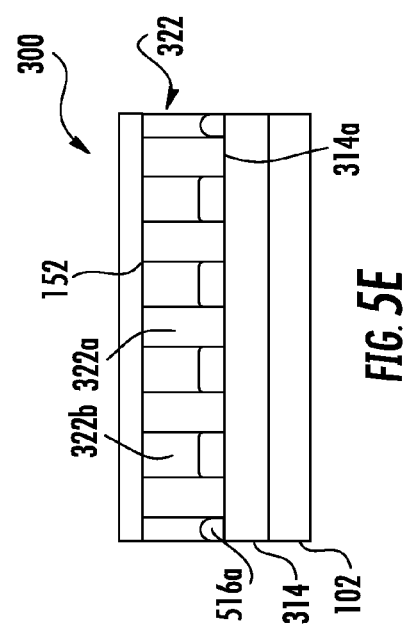

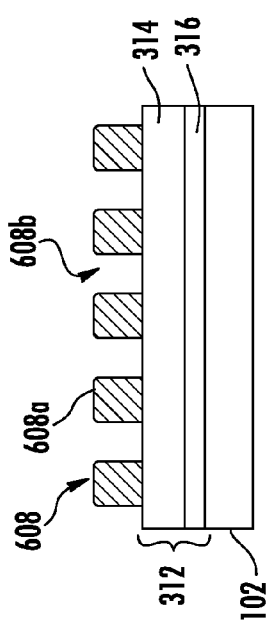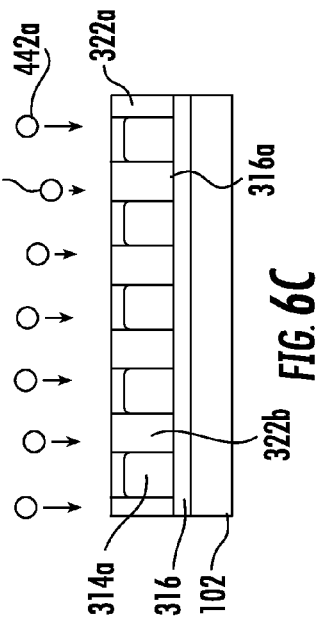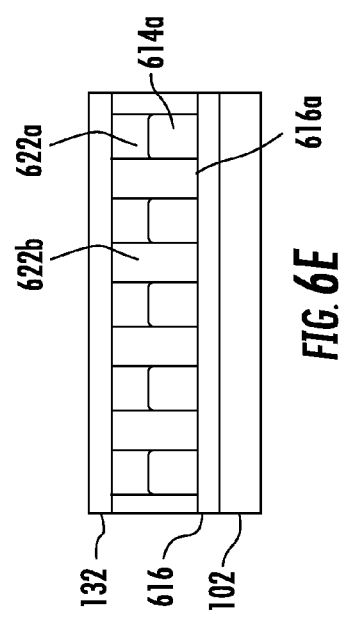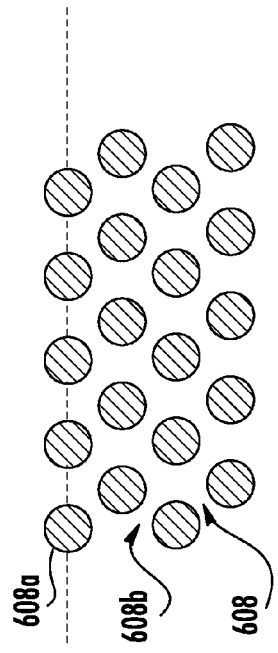

TECHNIQUE FOR MANUFACTURING BIT PATTERNED MEDIA

PRIORITY

This application claims priority to U.S. Provisional Application No. 61/429,456, filed on Jan. 4, 2011, and entitled "Bit Patterned Media And Techniques For Manufacturing The Same," which is incorporated in its entirety by reference.

RELATED APPLICATION

This application is related to co-pending U.S. application Ser. No. 13/228,426, filed on Sep. 8, 2011, and entitled "Technique for manufacturing Bit Patterned Media." The co-pending U.S. application Ser. No. 13/228,426, is herein incorporated in its entirety by reference.

FIELD

The present application relates to data storage media, particularly to a bit patterned media and techniques for manufacturing the data storage media.

BACKGROUND

A bit patterned media (BPM) is expected to extend the data storage density in hard drive disks and anticipated to be the next generation of data storage media. Conventionally, a data storage media 100 may comprise, among others, a base layer 102, a data storage layer 122, and a protective layer 132, as shown in FIG. 1f. Within the data storage layer 122, there may be a plurality of active regions 122a, each of which is used for storing a single data bit, and one or more separators 122b for isolating each active region 122a. In the conventional BPM 100, the active regions 122a are formed when BPM 100 is manufactured. This is contrary to earlier data storage media, where the active regions are formed while the data is recorded. As the storage capacity of a media depends on the number of the active regions 122a, a BPM 100 with greater number of active regions 122a is preferred.

In manufacturing the conventional BPM 100, the data storage layer 122 is formed above the base layer 102 and an intermediate layer 122 (FIG. 1a). The material in the data storage layer 104 may be magnetic material containing species that exhibit ferromagnetism. Thereafter, a resist layer 108 is deposited on the data storage layer 122 and patterned using a known lithographic process as shown in FIG. 1b. Examples of the known patterning process may include photolithographic process, nano-imprint lithographic process, and direct write electron beam lithographic process. As a result, a portion of the data storage layer 122 is exposed.

The exposed portion of the data storage layer 122 is then etched using, for example, an ion milling process. In this process, reactive ions 132 are directed toward the exposed portion of the data storage layer 122, and the material therein is removed (FIG. 1c). Meanwhile, a portion of the data storage layer 122 shielded from the reactive ions 152 by the resist 108 may remain on the base layer. If viewed from the side, the resulting media 100 may comprise columns 122a of ferromagnetic material spaced apart and isolated from each other by gaps. Such columns 122a may ultimately form the active regions 122a. Areas between the columns (e.g. gaps) are then filled with non-magnetic material with low permeability and remanence. This non-magnetic material forms the separators 122b (FIG. 1d). Thereafter, the media 100 is planarized (FIG. 1e), and a protective coating 152 is deposited on the data storage layer 122 (FIG. 1f). The resulting BPM 100, as noted above, comprises a data storage layer 122 having a plurality of active regions 122a isolated by one or more non-magnetic separators 122b.

As an improvement, a process of manufacturing BPM that incorporates ion implantation step has been proposed. This process is shown in FIG. 2a-2e. It should be appreciated by those of ordinary skill in the art that many components in FIG. 1a-1f are also incorporated into FIG. 2a-2e. As such, many of the components in FIG. 2a-2e should be understood in relation to FIG. 1a-1f.

First, the data storage layer 122 is formed on the base layer 102. Thereafter, the resist layer 108 is deposited on the data storage layer 122 (FIG. 2a). The resist layer 108 is then patterned using one of the known lithographic processes, and at least one region of the data storage layer 122 is exposed (FIG. 2b). When viewed from the top, the exposed region of the data storage layer 122 is surrounded by the non-exposed portion of the data storage layer. Thereafter, ions 234 are introduced and implanted into the exposed region of the data storage layer 222 (FIG. 2c). The ions 234, when implanted, convert the material in the exposed region from ferromagnetic material to a non-magnetic material with low permeability and ideally no remanence. This non-magnetic material may be the separator 222b. Meanwhile, material in the region 222a shielded from the ions 234 by the resist 108 may remain ferromagnetic and form the active regions 222a of the BPM 200 (FIG. 2d). The active region 222a may be surrounded and isolated from neighboring active region 222a by the separators 222b. After the active region 222a and the separator 222b are formed, the remaining resist 108 is removed, and the protective layer 152 is deposited thereon (FIG. 2e).

In this process, the separators 222b may form via various mechanisms. In one approaches, the separator 222b is formed via dilution of magnetic material. In this approach, the ferromagnetic material in the exposed region of the data storage layer 222 is implanted with species that do not exhibit magnetic property. With sufficient dose, Curie temperature of the resulting material is reduced to room temperature such that the material is no longer magnetic at room temperature. To achieve sufficient dilution, atomic concentration of ~10% or more of the diluting ions may be needed. For a media comprising cobalt (Co) based data storage layer of 30 nm thickness, a 10% concentration implies an ion dose of approximately $3 \times 10^{16}/cm^2$. This dose may be proportional to the thickness of the storage layer and thus may be less if the data storage layer is thinner.

In another approach, the magnetic material in the exposed region of the data storage layer 122 may be converted into nonmagnetic material via alteration of the material's crystallinity or microstructure. The ion implantation process is an energetic process that can cause many atomic collisions. During implantation, the material in the exposed region that is otherwise crystalline may become amorphous and/or disordered. As a result, the material may exhibit low ferromagnetism at room temperature. Meanwhile, the material shielded by the resist 108 may retain its original magnetic property. This approach may be effective if the original ferromagnetic layer is a multilayer that derives its magnetic properties from the interaction of very thin layers in a stack. However, this approach may also require a high ion dose. A typical ion dose necessary to amorphize/disorder a silicon substrate is $1 \times 10^{15}$ ions/$cm^2$ or higher. In a metal substrate, this required dose may be even higher, particularly if the implant is performed at room temperature.

Both approaches, however, have several drawbacks. One such drawback may be limited throughput caused in part by the high ion dose requirement. As noted above, each approach in forming the separator 222b requires an ion dose ranging about $1\times10^{16}$-$1\times10^{17}$ ions/cm2. However, the beam current in a conventional ion implanter is limited due to the limitations in generating the ions. Accordingly, such a high dose will limit the throughput or increase the time the ion implantation system has to process the media. With limited throughput, the cost associated with manufacturing BPM may be high.

The throughput may also be limited in part by the resist patterning step. As noted above, the electron beam direct write patterning step may be used to pattern the resist. In this process, an electron beam is scanned along one or more directions to directly write or pattern the resist. Although this process enables greater resolution, this process is very slow and it is not suitable for high throughput production.

The nano-imprint lithography process, a more efficient resist patterning, may be incapable of producing resist with desired properties. For example, the maximum practical resist height achieved in the nano-imprint lithography process may be limited to about 50 nm. Such resist may not survive the subsequent high dose ion implantation process and/or adequately protect the material underneath. A portion of the resist may sputter away during ion implantation, and portions of material outside of the exposed region (i.e. material originally under the resist 108) may be implanted with ions and also converted into the separator 222b. Accordingly, less than optimal BPM may result.

Moreover, high dose ion implantation used to form the separator 204a may also contribute to sputtering of the material in the exposed region. This sputtering effect proceeds in proportion to the total dose needed to form the separator 222b. This sputtering effect may result in a non-planar storage layer. Because the BPM manufacturing process that incorporates the ion implantation step is intended to omit the gap filling step (e.g. FIG. 1d), excessive non-planarity between the exposed region and the unexposed region may be highly undesirable.

Accordingly, a new method for manufacturing bit pattern media is needed.

SUMMARY

A technique for manufacturing bit patterned media is disclosed. In one particular exemplary embodiment, the technique may be realized as a method for manufacturing bit pattern media. The technique, which may be realized as a method comprising: forming a non-catalysis region on a first portion of a catalysis layer; forming a non-magnetic separator on the non-catalysis region; and forming a magnetic active region on a second portion of the catalysis layer adjacent to the first portion of the catalysis layer.

In accordance with other aspects of this particular exemplary embodiment, the forming the non-catalysis region may comprise: disposing a mask on the catalysis layer, wherein the mask comprises a transparent area aligned with the first portion of the catalysis layer and a non-transparent area aligned with the second portion of the catalysis layer; depositing the non-catalysis layer on the mask and first portion of the catalysis layer aligned with the transparent area of the mask; and selectively removing the mask without removing a portion of the non-catalysis layer deposited on the first portion of the catalysis layer.

In accordance with additional aspects of this particular exemplary embodiment, the forming the non-catalysis region may comprise: disposing a non-catalysis layer on the catalysis layer; and selectively etching a portion of the non-catalysis layer until the second portion of the catalysis layer is exposed.

In accordance with further aspects of this particular exemplary embodiment, the catalysis layer may comprise at least one of Ti, Ta, and Mg species.

In accordance with additional aspects of this particular exemplary embodiment, the non-catalysis region may comprise $SiO_2$.

In accordance with further aspects of this particular exemplary embodiment, the forming the magnetic active region may comprise introducing ferromagnetic material near the second portion of the catalysis layer and preferentially forming the magnetic active region containing the ferromagnetic material.

In accordance with additional aspects of this particular exemplary embodiment, the ferromagnetic material may comprise at least one of Fe, Co, Ni, Cr, and Pt species.

In accordance with other aspects of this particular exemplary embodiment, the forming the non-magnetic separator may comprise introducing non-ferromagnetic material near the non-catalysis region and preferentially forming the separator containing the non-ferromagnetic material.

In accordance with further aspects of this particular exemplary embodiment, the non-ferromagnetic material may be $SiO_2$.

In accordance with additional aspects of this particular exemplary embodiment, the method may further comprise: introducing into the non-catalysis region at least one species contained in the separator.

In accordance with further aspects of this particular exemplary embodiment, the introducing into the non-catalysis region at least one species contained in the separator may comprise implanting ions of the at least one species contained in the separator.

In accordance with additional aspects of this particular exemplary embodiment, the method may further comprise: introducing into the second portion of the catalysis layer at least one species contained in the magnetic active region.

In accordance with further aspects of this particular exemplary embodiment, the introducing into the second portion of the catalysis layer at least one species contained in the magnetic active region may comprise implanting ions of the at least one species contained in the magnetic active region.

In accordance with additional aspects of this particular exemplary embodiment, the method may further comprise: selectively amorphizing the non-catalysis region.

In accordance with another exemplary embodiment, the technique may be realized as a method comprising: forming a non-catalysis region and a catalysis region; and forming a non-magnetic separator on the non-catalysis region and forming a magnetic active region on the catalysis region, wherein the non-catalysis region and the non-magnetic separator have at least one common property, and wherein the catalysis region and magnetic active region have at least one common property.

In accordance with other aspects of this particular exemplary embodiment, the forming a non-catalysis region and a catalysis region may comprise: depositing a catalysis layer on a non-catalysis layer; disposing a mask on the catalysis layer, wherein the mask comprises a transparent area aligned with a first portion of the catalysis layer and a non-transparent area aligned with a second portion of the catalysis layer; and etching a first portion of the catalysis layer until a portion of the non-catalysis layer is exposed.

In accordance with further aspects of this particular exemplary embodiment, the method may further comprise ion implanting into the non-catalysis region at least one species contained in the separator.

In accordance with additional aspects of this particular exemplary embodiment, species of the ions implanted into the non-catalysis region comprise at least one of Si and O.

In accordance with further aspects of this particular exemplary embodiment, the method may further comprise: ion implanting into the catalysis region at least one species contained in the magnetic active region.

In accordance with additional aspects of this particular exemplary embodiment, species of the ions implanted into the catalysis region comprises at least one of Fe, Co, Ni, and Pt species.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 2a-2e illustrate another conventional method for manufacturing BPM.

FIG. 4a-4e illustrate an exemplary technique for manufacturing BPM according to one embodiment of the present disclosure.

FIG. 4f illustrates an exemplary mask that can be used in the technique shown in FIG. 4a-4e.

FIG. 5a-5e illustrate another exemplary technique for manufacturing BPM according to another embodiment of the present disclosure.

FIG. 5f illustrates another exemplary mask that can be used in the technique shown in FIG. 5a-5e.

FIG. 6a-6e illustrate another exemplary technique for manufacturing BPM according to another embodiment of the present disclosure.

FIG. 6f illustrates another exemplary mask that can be used in the technique shown in FIG. 6a-6e.

DETAILED DESCRIPTION

To solve the deficiencies associated with the methods noted above, novel techniques for manufacturing BPM are introduced. In the present disclosure, BPM may contain at least one catalysis region on which a magnetic, active region of the magnetic media may preferentially form. Bit patterned media may also comprise at least one non-catalysis region, on which the non-magnetic separator may preferentially form. Various processes, and systems for performing such processes, are incorporated in forming the catalysis region, the non-catalysis region, the active region, and the separator. Such processes include various patterning, deposition, etch, position, doping processes, and systems for performing such processes. For clarity, specific examples of the processes are provided. However, those skilled in the art will recognize other processes and systems not described in the present disclosure are not necessarily precluded.

Figure 1A:
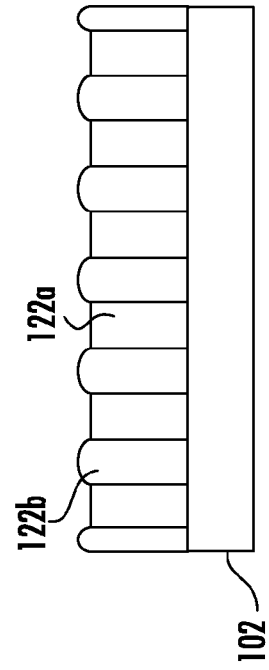
FIG. 1a-1f illustrate a conventional method for manufacturing BPM.
Figure 1B:
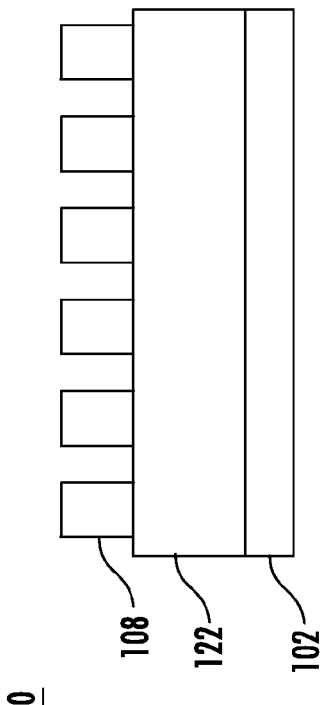
Figure 1D:
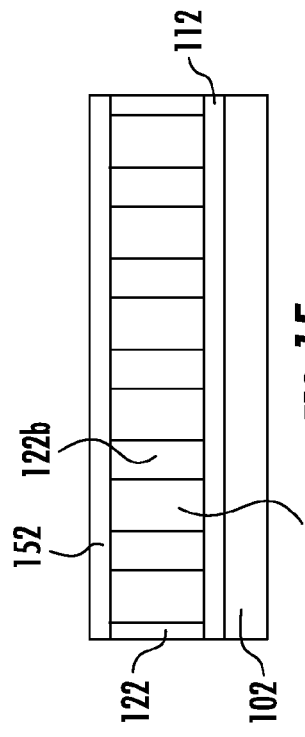
Figure 1C:
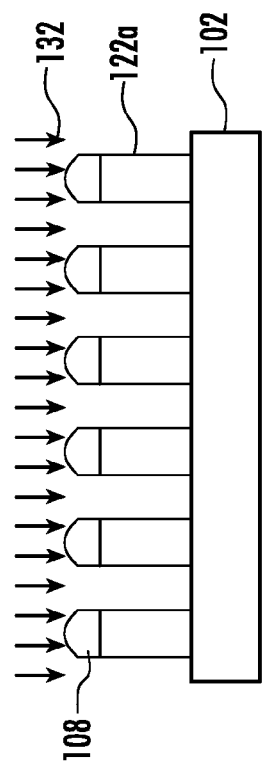
Figure 1E:
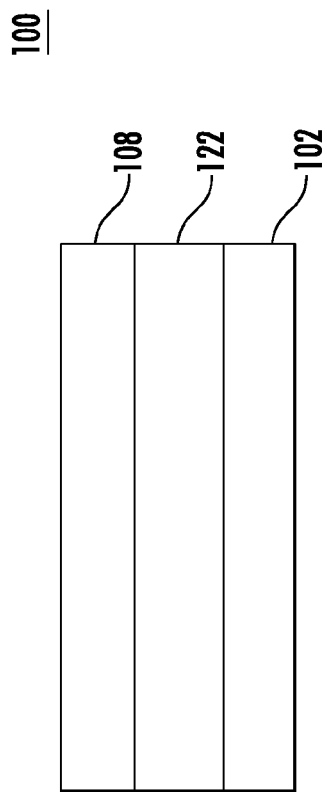
Figure 1F:
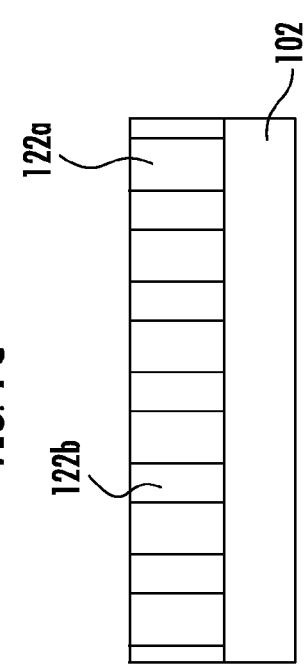
Figure 3A:
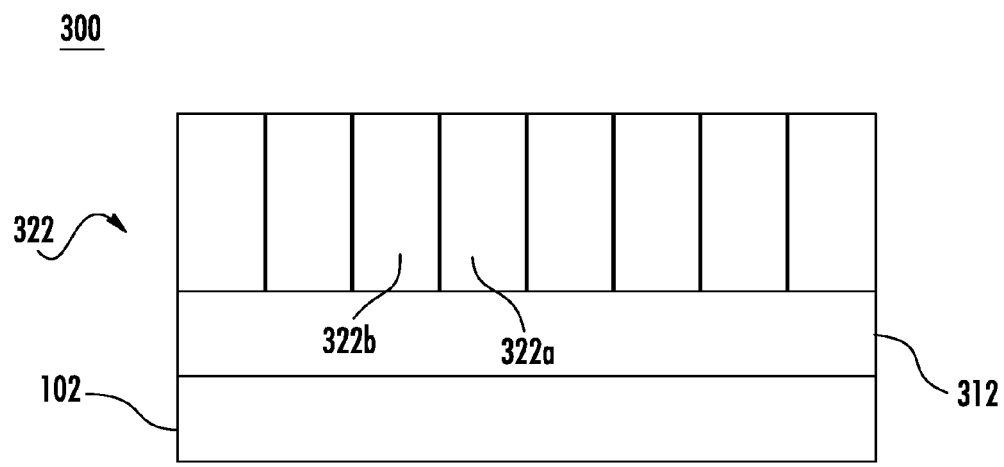
FIGS. 3a and 3b illustrate side and plan views of an exemplary BPM according to one embodiment of the present disclosure.
Figure 3B:
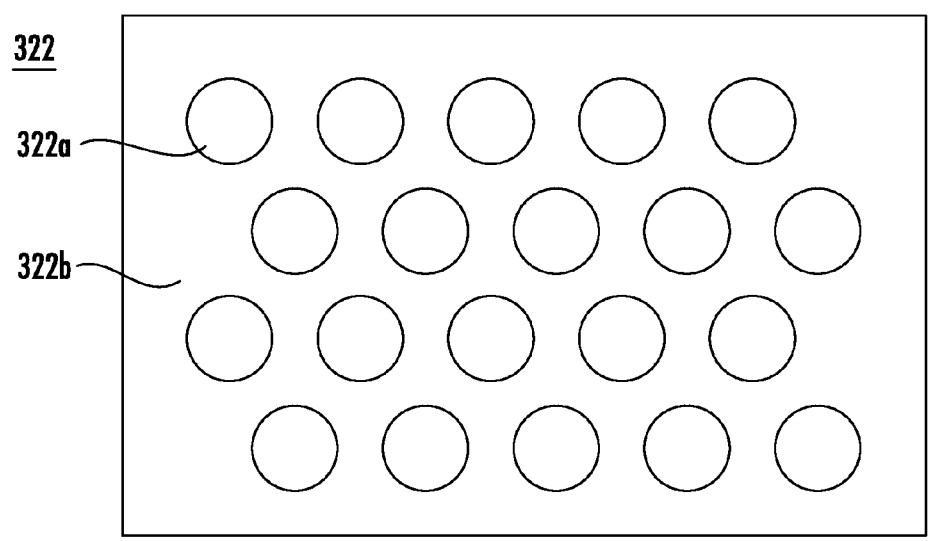

Referring to FIGS. 3a and 3b there are shown side and plan views of a BPM 300 according to one embodiment of the present disclosure. Those of the ordinary skill in the art will recognize that the figure is not necessarily drawn to scale. As illustrated in FIG. 3a, BPM 300 of the present disclosure comprises the base layer 102 and a data storage layer 322 disposed on the base layer 102. In addition, BPM 300 of the present disclosure comprises an intermediate layer 312 interposed between the base layer 102 and the data storage layer 322.

In the data storage layer 322, there may be at least one active region 322a, in which a data bit may be stored, and at least one separator 322b. The material in the active region 322a may be magnetic material (e.g. exhibiting ferromagnetism or ferrimagnetism), whereas the material in the separator 322b may be non-magnetic material. Examples of the preferred material in the active region 322a may include those containing species such as iron (Fe), cobalt (Co), nickel (Ni), chromium (Cr), and platinum (Pt). However, other materials of high permeability and remanence and containing other species are not precluded in the present disclosure. Meanwhile, the preferred material in the separator 322b may be non-magnetic material capable of magnetically decoupling neighboring active region 322a. Although various materials may be used, and thus not precluded, silicon dioxide (SiO2) is preferred as the material in the separator 322b.

As illustrated in FIG. 3b, the active region 322a may be approximately circular or round shape, when viewed from the top. However, other shapes are not precluded in the present disclosure. The separator 322b may surround the active region 322a such that it may magnetically isolate one active region 322a from neighboring active region 322a. In the present disclosure, the separator 322b may be single and continuous or a plurality of non continuous segments.

In one embodiment, the active region 322a may have width or diameter ranging about 5 nm to about 10 nm. The separator 322b, in one embodiment, may preferably have a thickness ranging about 1 nm to about 4 nm. In another embodiment, the separator 322b may have other thicknesses. The former thickness range is preferred as such thickness range may enable the separator 322b to sufficiently decouple the active region 322a and minimize spin direction of one active region 322a from being affected by the neighboring active region 322a. The separator 322b with less thickness, although not preferable, is not precluded as long as it is capable of sufficiently decoupling the neighboring active region 322a. Meanwhile, the separator 322b with greater thickness, although not precluded, may not be preferred as such a separator 322b may decrease the density or the number of the active regions 322a in BPM 300.

Returning to FIG. 3a, BPM 300 of the present disclosure may also comprise an intermediate layer 312. As described in detail below, the intermediate layer 312 may comprise a catalysis layer and/or catalysis region, on which active region 322a may form. The intermediate layer 342 may also comprise a non-catalysis layer or non-catalysis region, on which the separator 322b may form. In the present disclosure, the catalysis layer/region may serve as the template for the active region 322a forming thereon, whereas the non catalysis layer/ region may serve as the template for the separator 322b forming on the non catalysis layer/region. The non-catalysis layer/region may be positioned above or below the catalysis layer/region.

In the present disclosure, each layer/region serving as the template and the region formed thereon may have at least one similar property. Examples of the common or similar property may include a crystal structure, species, and other chemical properties. In one particular embodiment, the common property is the crystal structure, and the active region 322a and the catalysis layer/region are polycrystalline. In such a scenario, it may be preferable that the crystals in the active region 322a and the catalysis layer/region have similar structure and/or orientation. In another particular embodiment, the non-catalysis layer/region and the separator 322b may be amorphous. Yet in another particular embodiment, the common property may be a common species. In particular, the catalysis layer/region may include at least one species that is also contained in the active region 322a. Optionally, the non-catalysis layer/region and the separator 322b may also have at least one common species.

In addition, different template layers/regions preferably have contrasting properties. In one particular example, the catalysis layer/region is polycrystalline, whereas the non-catalysis layer/region is amorphous. In another particular example, the catalysis layer/region and the non-catalysis layer/region have no species in common.

In the present disclosure, a variety of materials may be used to form the catalysis layer/region. Examples of the material of the catalysis layer/region include a material containing titanium (Ti), tantalum (Ta), and/or magnesium (Mg) species. A specific example includes magnesium oxide (MgO). Meanwhile, the material in the non-catalysis layer/region, in one embodiment, may be silicon dioxide ($SiO_2$). Those of ordinary skill in the art will recognize that the materials in the catalysis and non-catalysis layers/regions are not limited to those described above, and other materials may be used.

Referring to FIG. 4a-e, there is shown a technique 400 for manufacturing BPM 300 according to one embodiment of the present disclosure. FIG. 4f illustrates a plan view of a mask 408 used in the technique. It should be appreciated that several components in FIGS. 3a and 3b are incorporated into FIG. 4a-4f. A detailed description of such components, for clarity and simplicity, may not be repeated. As such, FIG. 4a-4f should be understood in relation to FIGS. 3a and 3b.

In manufacturing the BPM 300, an intermediate layer 312 may be formed on the base layer 102. The intermediate layer 412 of the present embodiment may comprise a catalysis layer 314, a portion of which (i.e. catalysis region 314a) may serve as the template for the active region 322a forming thereon. The intermediate layer 312 may also comprise a non catalysis layer 316 formed on the catalysis layer 414. In the present embodiment, a portion of the non-catalysis layer 316 (i.e. non-catalysis region 316a) may serve as the template for a separator 422b forming thereon.

On the non-catalysis layer 316 of the intermediate layer 312, a mask 408 is disposed. Various types of mask 408, including a soft mask, a hard mask, a shadow mask, or a combination thereof, may be used. In the present embodiment, resist 408 may be used as the mask 408. As illustrated in FIG. 4f, the mask 408 may comprise at least one transparent area 408b (e.g. apertures or gaps) defined by at least one non-transparent area 408a. When disposed, a portion of the non-catalysis layer 316 aligned with the transparent area 408b of the mask 408 is exposed, as shown in FIG. 4a.

The exposed portion of the non-catalysis layer 316 may then be etched until a portion of the catalysis layer 314 is exposed. The etching processes that may be performed to expose the catalysis layer 314 may include a physical, chemical, wet, dry, or plasma based etching process. Other types of etching processes may also be performed. A step to remove the mask 408 may follow the etching process. After the mask 408 is removed, the resulting structure may comprise at least one non-catalysis region 316a disposed on the catalysis layer 314, as shown in FIG. 4b. Next to the non-catalysis region 316a, the exposed portion of the catalysis layer (i.e. the catalysis region 314a) may be disposed.

In the present embodiment, all trace of the mask 408 is preferably removed. If necessary, additional cleaning surfaces may optionally be performed to remove one or more atomic layers of non-catalysis region 316a and the catalysis region 314a. For example, approximately 2 nm of material may be removed from the surfaces of the catalysis region 314a and/or the non-catalysis region 316a. This cleaning process may enhance subsequent epitaxial deposition or growth of the material thereon. An example of the cleaning processes may include the sputter cleaning process. However, other cleaning processes may also be used.

After forming the catalysis region 314a and the non-catalysis region 316a, the data storage layer 322 may be formed (FIG. 4c). In the present embodiment, active region forming material 442a may be introduced on the catalysis region 414a to form magnetic, active region 322a. Meanwhile, separator forming material 442b may be introduced on the non-catalysis region 416a to form the non-magnetic, separator 322b. In the present embodiment, the active regions forming material 442a may include one or more of Fe, Co, Cr, and Pt species. However, other species are not precluded. Meanwhile, examples of separator forming materials may be materials containing Si or O. The active region forming material 442a and the separator forming material 442b may be introduced simultaneously. Alternatively, the active region forming material 442a and the separator forming material 442b may be introduced one after another, in such an embodiment, one of the active region 322a and the separator 322b may form after the formation of the other one of the active region 322a and the separator 322b. Although various deposition processes may be used, a sputter deposition process may be preferred.

As illustrated in FIGS. 4c and 4d, the active region 322a may preferentially form on the catalysis region 314a using the catalysis region 314a as a template. Likewise, the separator 322b may preferentially form on the non-catalysis region 316a using the non-catalysis region 316a as a template. In the present disclosure, the preferential formation may be due to similarities between the material serving as the template and the material formed thereon. For example, the catalysis region 314a may be polycrystalline, and polycrystalline active region 322a may preferentially form on the polycrystalline catalysis region 314a. Meanwhile, the non-catalysis region 316a may be amorphous, and amorphous separator 322b may preferentially form on the amorphous non-catalysis region 316. The preferential formation may also be due to a common species contained in the material serving as the template and the material formed thereon. For example, $SiO_2$ separator 322b may preferentially form over the non-catalysis region 316a containing either Si or O species (e.g. Si based material or oxide material).

In addition, the preferential formation may be due to the contrasting properties between different template regions and/or between the template region and the material formed on the adjacent template region (e.g. different properties between the non-catalysis region 316a and the active region 322a). In the present disclosure, such contrasting properties may include structural difference, difference in species, or difference in any other properties. In one embodiment, the non-catalysis region 316a may be amorphous, whereas the catalysis region 314a is polycrystalline. Moreover, the active region 322a may be polycrystalline. Such a polycrystalline active region 322a may be less likely to form on the amorphous non-catalysis region 316a. Instead, the active region 322a may be formed on the polycrystalline catalysis region 314a. Meanwhile, amorphous separator 322b may preferentially form on the amorphous non-catalysis region 316a.

In the present disclosure, the materials in the catalysis region 314a and the non-catalysis region 316a may be chosen to enhance the preferential formation of the active region 322a and the separator 322b. Moreover, additional processes may be performed on the catalysis region 314a and the non-catalysis region 316a to further enhance the preferential formation. For example, the annealing process may be performed on the catalysis region 314a to enhance crystallinity in the region. In another example, the ion implantation process may be performed on the non-catalysis region 316a to further amorphize the region. Yet in another example, species found in the active region 322a may be introduced into the catalysis region 314a and/or species found in the separator 322b may be introduced into the non-catalysis region 316a. Such species may be introduced via ion implantation, diffusion, or any other doping or species introducing process. Such processes may be performed prior to the formation of the active region 322a and the separator 322b.

As preferential formation occurs, well organized, heteroepitaxial formation of the active region 322a and separator 322b may be achieved. Thereafter, the protective layer 152, such as, for example, DLC cap layer, may be deposited, as shown in FIG. 4e.

Referring to FIG. 5a-e, there is shown another technique 500 for manufacturing BPM 300 according to another embodiment of the present disclosure. FIG. 5f illustrates a plan view of a mask 508 used in the technique. It should be appreciated that several components in FIGS. 3a, 3b, and 4a-4f are also incorporated into FIG. 5a-5f. A detailed description of such components, for clarity and simplicity, may not be repeated. As such, FIG. 5a-5f should be understood in relation to FIG. 3a, 3b, 4a-4f.

As illustrated in FIG. 5a, the catalysis layer 314 may be disposed on the base layer 102. Thereafter, a mask 508 is disposed thereon. The mask 508 may comprise at least one transparent area 508b (e.g. apertures or gaps) defined by at least one non-transparent area 508a (FIG. 5f). When disposed on the catalysis layer 314, the non-transparent area 508a shields a portion of the catalysis layer 314. Meanwhile, a portion of the catalysis layer 314 aligned with the transparent area 508a may be exposed.

As illustrated in FIG. 5b, a non-catalysis layer 516 may then be deposited over the mask 508 and on the exposed portion of the catalysis layer 414, as illustrated in FIG. 4b. Thereafter, the mask 508 is removed from the catalysis layer 314 using, for example, a resist lift off process. Other mask removal processes may also be used. When the mask 508 is removed, a portion of the non-catalysis layer 516 deposited on the non-transparent area 508a of the mask 508 may be removed. However, another portion of the non-catalysis layer 516 deposited on the catalysis layer 314 may remain on the catalysis layer 314, as illustrated in FIG. 5c. This remaining portion may be the non-catalysis region 516a. At the same time, a portion of the catalysis layer 314 exposed after the removal of the mask 508 may be the catalysis region 314a. As a result, a non-catalysis region 516a may form on a portion of the catalysis layer 314, and a catalysis region 414a may form next to the non-catalysis region 516a.

Thereafter, the active region forming material 442a may be introduced on the catalysis region 314a to form magnetic, active region 422a (FIG. 5d). Meanwhile, separator forming material 442b may be introduced on the non-catalysis region 516a to form the non-magnetic, separator 422b. Similar to the earlier embodiment, the active region forming material 442a and the separator forming material 442b may be introduced simultaneously or one after another. Although various deposition processes may be used, a sputter deposition process may be preferred.

As illustrated in FIG. 5d, the active region 322a may preferentially form over the catalysis region 314a that is serving as the template for the active region 322a. Meanwhile, the separator 322b may preferentially form over the non-catalysis region 516a that serves as the template for the separator 322b. As a result, well organized, heteroepitaxy of the active region 322a and the separator 322b may occur. Thereafter, the protective layer 152, such as, for example, DLC cap layer, may be deposited, as shown in FIG. 5e.

As noted above, the preferential formation may be due to similar properties between the active region 322a and the catalysis region 314a, and between the separator 322b and the non-catalysis region 516a. Alternatively the preferential formation may be due to contrasting properties between materials in the catalysis region 314a and the separator 322b, and/or between the materials in the non-catalysis region 516a and the active region 322a Additional processes such as annealing, ion implantation, and/or doping processes may be performed in order to enhance the preferential formation.

In some embodiments, an optional cleaning process may also be performed to remove all traces of the mask 508 and/or thoroughly clean the surface of the catalysis region 314a and/or the non-catalysis region 516a. This optional cleaning process may be performed prior to introducing the active region forming material 442a or the separator forming material 442b. This cleaning process may enhance epitaxial deposition or growth of the active region 322a and the separator 322b.

Referring to FIG. 6a-6e, there is shown another exemplary technique 600 for manufacturing BPM 300 according to another embodiment of the present disclosure. FIG. 6f illustrates the plan view of a mask 608 used in this embodiment. It should be appreciated that several components in FIGS. 3a, 3b, 4a-4f and 5a-5f are incorporated into FIG. 6a-6f. A detailed description of such components, for clarity and simplicity, may not be repeated. As such, FIG. 6a-6f should be understood in relation to FIGS. 3a, 3b, 4a-4f, and 5a-5f.

As illustrated in FIG. 6a, the intermediate layer 312, which comprises the catalysis layer 314 disposed on the non-catalysis layer 316, is formed on the base layer 102. On the catalysis layer 314, a mask 608 is disposed. The mask 608 may comprise one or more transparent areas 608b (e.g. apertures or gaps) defined by at least one non-transparent area 608a (FIG. 6f). When disposed on the catalysis layer 314, the non-transparent area 608a shields a portion of the catalysis layer 314. Meanwhile, another portion of the catalysis layer 314 aligned with the transparent area 608a may be exposed (FIG. 6a).

After mask 608 is disposed, the portion of the catalysis layer 314 aligned with the transparent area 608b of the mask 608 is etched until a portion of the non-catalysis layer 316 disposed underneath is exposed. In the process, the catalysis region 314a and the non-catalysis region 316a may be formed. The etching process that may be performed may include a physical, chemical, wet, dry, or plasma based etching process. Other types of etching processes may also be performed. After the etching process, the mask 508 may be removed. The resulting structure may comprise the base layer 102 and at least one catalysis region 314a and at least one non-catalysis region 316a proximate to the catalysis region 314a (FIG. 6b).

Thereafter, the active region forming material 442a may be introduced on the catalysis region 314a to form magnetic, active region 622a (FIGS. 6c and 6d). Meanwhile, separator forming material 442b may be introduced on the non-catalysis region 316a to form the non-magnetic, separator 322b. Similar to the earlier embodiments, the active region forming material 442a and the separator forming material 442b may be introduced simultaneously or one after another. Although various deposition processes may be used, a sputter deposition process may be preferred.

As noted earlier, the active region 322a may preferentially form over the catalysis region 314a that is serving as the template for the active region 322a. Meanwhile, the separator 322b may preferentially form over the non-catalysis region 316a that serves as the template for the separator 322b. As a result, well organized, heteroepitaxy of the active region 322a and the separator 322b may occur. Thereafter, the protective layer 152, such as, for example, DLC cap layer, may be deposited, as shown in FIG. 6e.

As noted above, the preferential formation may be due to similar properties between the active region 322a and the catalysis region 314a, and between the separator 322b and the non-catalysis region 316a. Alternatively, the preferential formation may be due to contrasting properties between materials in the catalysis region 314a and the separator 322b, and/or between the materials in the non-catalysis region 316a and the active region 322a. Additional processes such as annealing, ion implantation, and/or doping processes may be performed in order to enhance the preferential formation.

In some embodiments, an optional cleaning process may also be performed to remove all traces of the mask 608 and/or thoroughly clean the surface of the catalysis region 314a and/or the non-catalysis region 316a. This optional cleaning process may be performed prior to introducing the active region forming material 442a or the separator forming material 442b. This cleaning process may enhance epitaxial deposition or growth of the active region 322a and the separator 322b.

A novel BPM and a method for manufacturing the same are disclosed. Compared to the conventional magnetic media or the conventional method, the present disclosure provides additional advantages. For example, BPM formed according to the method disclosed herein may avoid topographical non-uniformity shown in a conventional BPM manufacturing process. Although the present disclosure has been described herein in the context of particular embodiments having particular implementation in a particular environment for a particular purpose, those of ordinary skill in the art will recognize that its usefulness is not limited thereto and that the present disclosure may be beneficially implemented in any number of environments for any number of purposes. Various changes in form and detail may be made without departing from the spirit and scope of the invention as defined herein.

What is claimed is:

1. A method for forming a magnetic data storage media, the method comprising:
    forming a first layer to serve as a first template for growth of a plurality of magnetic active regions, wherein the first template comprises a crystalline material;
    forming a second layer that is continuous and disposed on at least a part of the first layer, the second layer to serve as a second template for growth of a non-magnetic region, wherein the second template comprises a non-crystalline material;
    patterning the second layer to define a first region of the second layer on a first portion of the first layer and a plurality of exposed regions of the first layer having exposed surfaces that are isolated from one another, wherein the first layer extends continuously between the plurality of exposed regions;
    forming a non-magnetic separator on the first region; and
    forming a plurality of magnetic active regions on the plurality of exposed regions.

2. The method according to claim 1, wherein the forming the first region comprises:
    disposing a mask on the first layer, wherein the mask comprises a transparent area aligned with the first portion of the first layer and a non-transparent area aligned with a plurality of regions of the first layer that correspond to the plurality of exposed regions;
    depositing the second layer on the mask and first portion of the first layer aligned with the transparent area of the mask; and
    selectively removing the mask without removing a portion of the second layer deposited on the first portion of the first layer.

3. The method according to claim 1, wherein the forming the non-catalysis region comprises:
    disposing a non-catalysis layer on the catalysis layer; and
    selectively etching a portion of the non-catalysis layer until the second portion of the catalysis layer is exposed.

4. The method according to claim 1, wherein the first layer comprises at least one of Ti, Ta, and Mg species.

5. The method according to claim 1, wherein the first region comprises $SiO_2$.

6. The method according to claim 1, wherein the forming the magnetic active region comprises introducing ferromagnetic material on the plurality of exposed regions of the first layer and preferentially forming the plurality of magnetic active regions containing the ferromagnetic material.

7. The method according to claim 6, wherein the ferromagnetic material comprises at least one of Fe, Co, Ni, Cr, and Pt species.

8. The method according to claim 7, wherein the forming the non-magnetic separator comprises introducing non-ferromagnetic material on the first region and preferentially forming the separator containing the non-ferromagnetic material.

9. The method according to claim 8, wherein the non-ferromagnetic material is $SiO_2$.

10. The method according to claim 1, further comprising:
    introducing into the first region at least one species contained in the separator.

11. The method according to claim 10, wherein the introducing into the first region at least one species contained in the separator comprises implanting ions of the at least one species contained in the separator.

12. The method according to claim 11, further comprising:
    introducing into the plurality of exposed regions of the first layer at least one species contained in the plurality of magnetic active regions.

13. The method according to claim 12, wherein the introducing into the plurality of exposed regions of the first layer at least one species contained in the plurality of magnetic active regions comprises implanting ions of the at least one species contained in the plurality of magnetic active regions.

14. The method according to claim 1, further comprising:
    selectively amorphizing the first region.

15. A method for forming a magnetic data storage media, the method comprising:
- forming a first layer to serve as a first template for growth of a plurality of magnetic active regions, wherein the first template comprises a crystalline material;
- forming a second layer that is continuous on the first layer, the second layer to serve as a second template for growth of a non-magnetic region, wherein the second template comprises a non-crystalline material;
- patterning the second layer to define a first region of the second layer and and a plurality of exposed regions of the first layer having exposed surfaces that are isolated from one another, wherein the first layer extends continuously between the plurality of exposed regions;
- forming a non-magnetic separator on the first region; and
- forming a plurality of magnetic active regions on the plurality of exposed regions.

16. The method according to claim 15, wherein the patterning the second layer comprises:
- forming a mask having a transparent area that defines an exposed area of the second layer; and
- etching the exposed area of the second layer until a portion of the first layer is exposed.

* * * * *